May 6, 1952     M. PASQUIER     2,595,879
FEEDING MEANS FOR VARIABLE WIDTH EDGE JOINTERS
Filed Oct. 14, 1946     4 Sheets-Sheet 1

INVENTOR
MICHEL PASQUIER
BY Cook and Schermerhorn
ATTORNEYS

INVENTOR
MICHEL PASQUIER
BY Cook and Schermerhorn
ATTORNEYS

May 6, 1952   M. PASQUIER   2,595,879
FEEDING MEANS FOR VARIABLE WIDTH EDGE JOINTERS
Filed Oct. 14, 1946   4 Sheets-Sheet 3
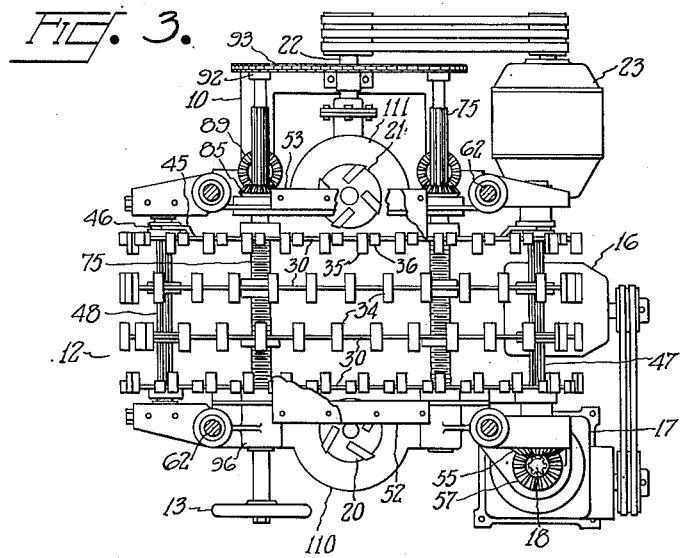
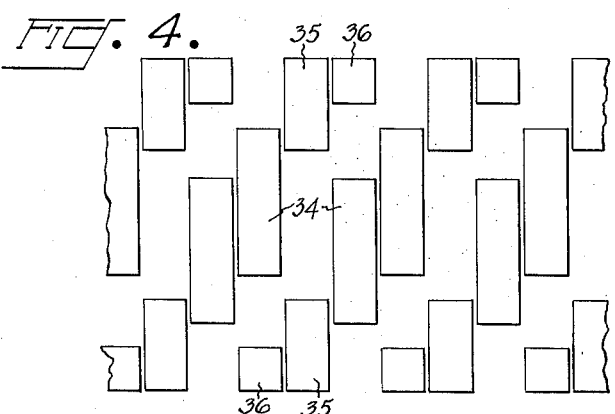
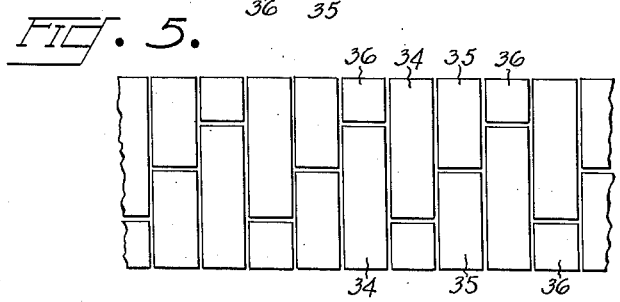
INVENTOR
MICHEL PASQUIER
BY
ATTORNEYS

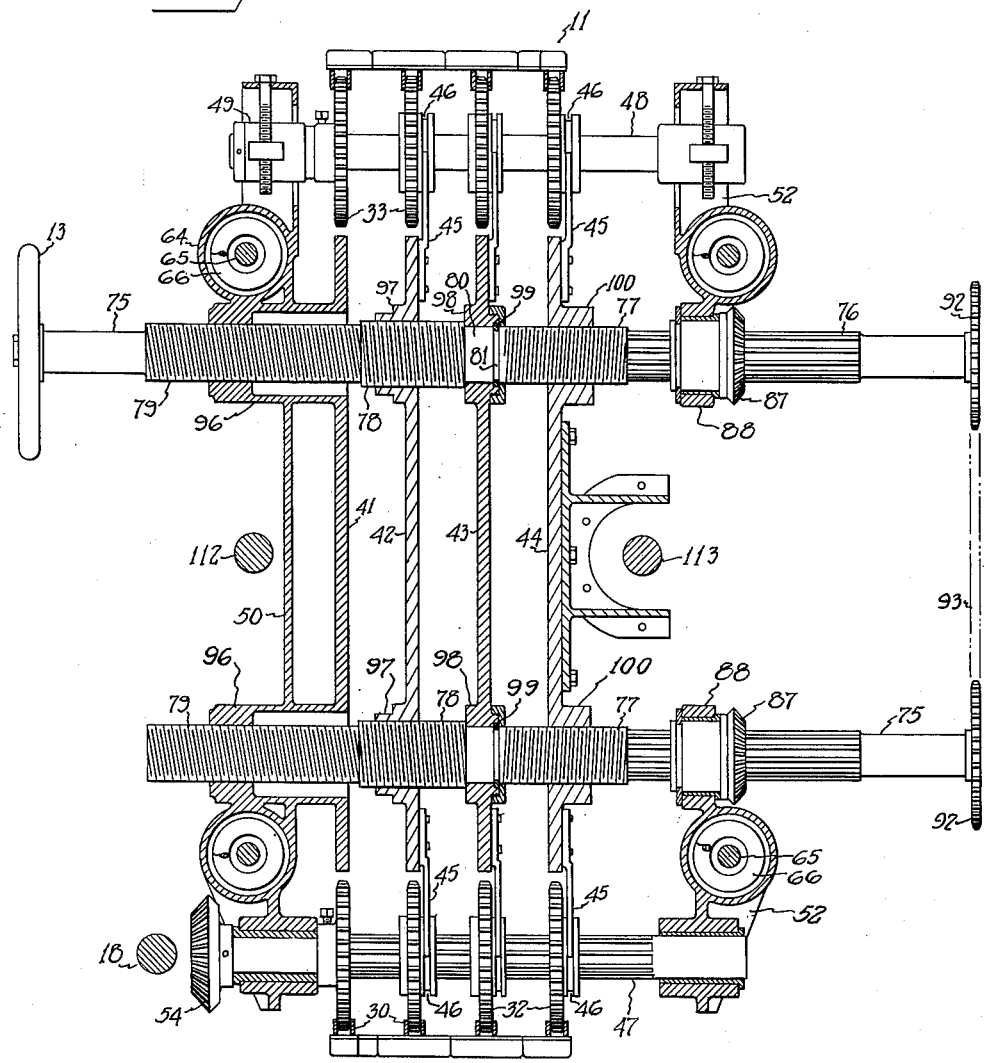

Patented May 6, 1952

2,595,879

UNITED STATES PATENT OFFICE 2,595,879

FEEDING MEANS FOR VARIABLE WIDTH EDGE JOINTERS

Michel Pasquier, Portland, Oreg., assignor to M and M Wood Working Company, Portland, Oreg., a corporation of Oregon Application October 14, 1946, Serial No. 703,257

8 Claims. (Cl. 144—245)

This invention relates, in general, to a variable width edge jointer, and has particular reference to a machine for handling a portion of a flitch of wood strips or veneers as a unit for simultaneously jointing the opposite edges of the strips.

The general object of the present invention is to provide a machine which will handle portions of flitches of different width and thickness each as a unit in order to perform simultaneous jointing operations on the opposite side edges of all the individual strips therein. One method of making wood veneers for the manufacture of plywood and other purposes is to slice strips of the desired thickness from a generally rectangular timber or cant. After the slicing operation, such strips must be edge jointed to make their opposite edges straight and parallel. The present invention embodies machine elements for handling a portion of a flitch of such strips which have been piled or reassembled in the same relative positions they originally occupied in the cant, so that a plurality of the strips may simultaneously be edge jointed in a single operation.

The machine comprises, essentially, conveyor means adapted to clamp the strips or veneers firmly together and pass them between cutter heads of sufficient size to joint a total thickness of stock up to several inches in one pass through the machine. A flitch which does not exceed this thickness may be fed into the machine as a unit, but thicker flitches are divided into parts to best utilize the capacity of the machine. Various adjustments are provided for handling units of stock of different thickness and width, while, at the same time, maintaining a firm grip thereon to hold the individual strips securely in their original positions. Thus, the stock is gripped between upper and lower conveyors which are adjustable in vertical spacing, expandable and contractible in width, and provided with interfitting stock engaging surfaces which are automatically uniformly distributed over the top and bottom surfaces of the stock in the various width adjustments.

Other objects are, accordingly, to provide variable width conveyor means having stock engaging and supporting elements distributed in a uniform pattern over the stock throughout the range of width adjustment, to provide driving means for conveyors of the type described to accommodate such width adjustment, to provide means for adjusting the cutter heads coordinately with the adjustment of the conveyors, to provide driving means for the cutter heads to accommodate such adjustment, to provide vertical adjustment between the upper and lower conveyors to accommodate stock of different thickness therebetween, and to provide novel resilient means to cause the plurality of stock engaging elements of the upper and lower conveyors to exert a uniform gripping engagement on all parts of the stock embraced therebetween.

With the foregoing and other objects in view, the invention resides in the combination of parts and in the details of construction hereinafter set forth in the following specification and appended claims, a preferred embodiment thereof being illustrated in the accompanying drawings, in which:

Figure 3 is a top plan view of the machine in maximum width adjustment, with certain parts broken away;

Figure 4 is a view on an enlarged scale showing the arrangement of the stock supporting pads on one of the conveyors in an intermediate width adjustment;

Figure 5 is a view similar to Figure 4 showing the interfitting relation of the stock supporting pads when the conveyor is adjusted for minimum width;

Figure 6 is a sectional view taken on the line 6—6 of Figure 2, but showing the conveyor guide plates in an intermediate width adjustment.

*General description of the machine*

Figure 1:
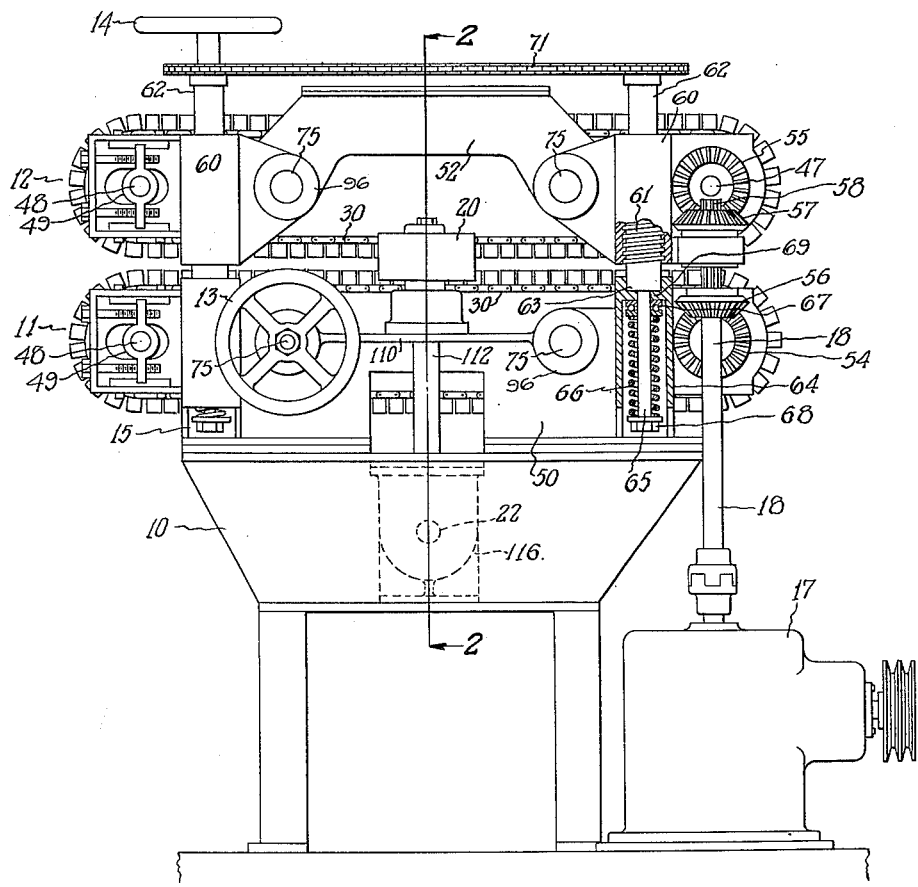
Figure 1 is a side elevational view of an edge jointing machine constructed according to the principles of the invention.

The operating instrumentalities of the present machine are carried upon a base designated generally by the numeral 10. Upon the base 10 at a fixed height is a bottom conveyor 11 adjustable only in width, and immediately thereabove is a similar top conveyor 12 adjustable both vertically and in width, so that the two conveyors are adapted to receive between them stock of different width and thickness. The width of both conveyors is adjusted simultaneously by the hand wheel 13, and the vertical position of the top conveyor 12 is adjusted simultaneously at its four corners by the hand wheel 14. The latter adjustment is associated with four corner supports 15 having individual coil springs to provide resilience in the suspension of the top conveyor to apply a compressive force to the stock carried between the conveyors and to prevent damage to the machine if any particular piece of stock is too thick for the vertical adjustment at which the machine happens to be set. The two conveyors are driven by a motor 16 which is belted to a worm gear speed reducing unit 17 for imparting a relatively slow rotation to a vertical drive shaft 18. This general organization is best shown in Figures 1 and 3.

Figure 2:
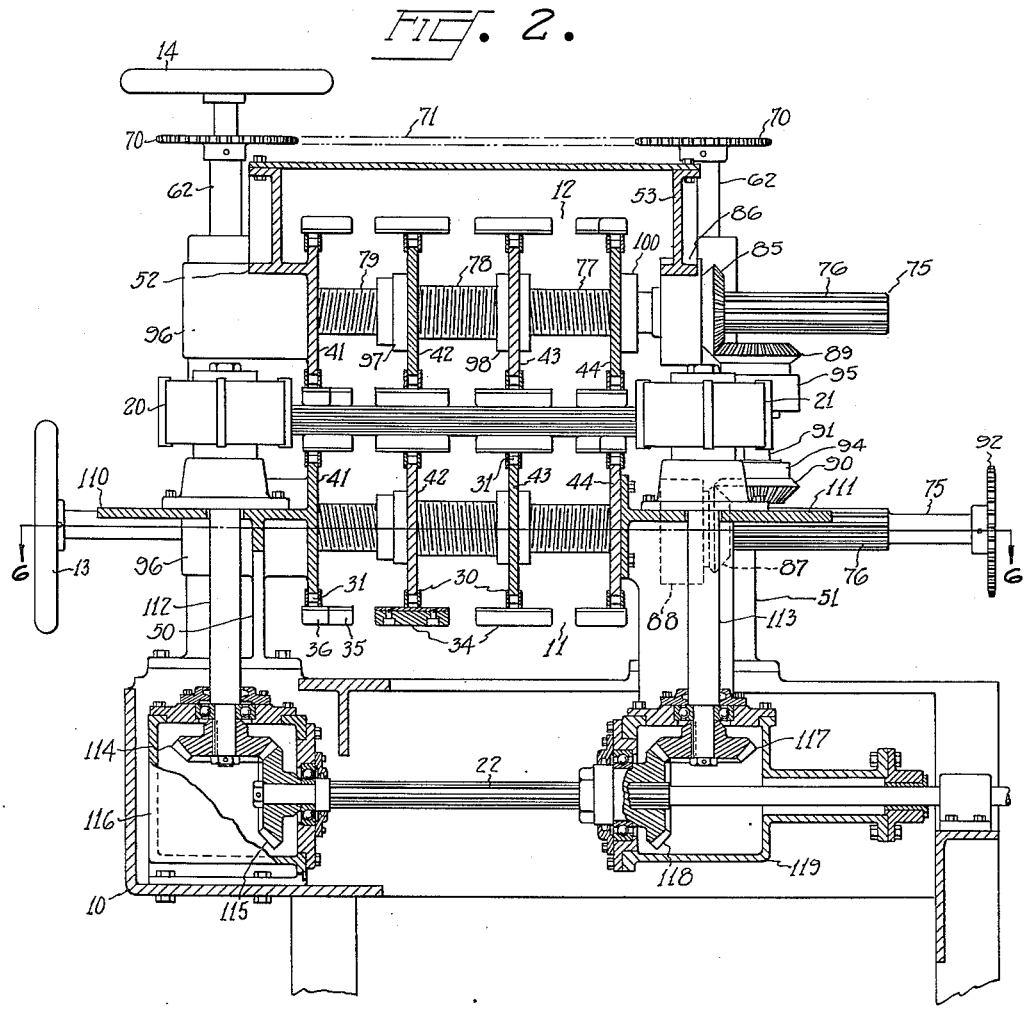
Figure 2 is a cross sectional view taken on the line 2—2 of Figure 1, showing the machine in maximum width adjustment.

In a jointing operation, stock gripped between the conveyors 11 and 12 is passed between a pair of vertical cutter heads 20 and 21 of sufficient length to act upon stock of any thickness up to the maximum separation of the conveyors. The cutter 20 is mounted in a fixed position adjacent one side of the conveyors which always occupies the same position, but the cutter head 21 is mounted to move transversely of the machine when the conveyors are made narrower or wider, so that this cutter also remains in fixed position with respect to the movable side of the conveyors. The cutter heads are both driven from a horizontal cutter shaft 22 which is belted to a motor 23, as shown in Figures 2 and 3.

The conveyor system

The conveyors 11 and 12 each comprises four parallel endless chains 30 which are adapted to be moved laterally together or apart by the width adjustment mechanism to provide in effect a pair of variable width belts. The chains are equipped with rollers 31 for engagement with driving sprockets 32 and idler sprockets 33, these sprockets and chain elements being identified by the same reference numerals in both top and bottom conveyors. The two intermediate chains in each conveyor carry identical long rubber pads 34, centered on the chains, and the two side chains carry shorter pads 35 and 36, the pads being spaced on the chains so as to closely interfit as shown in Figure 5 when the chains are brought laterally close together in the minimum width adjustment of the conveyors, and to provide uniformly distributed points of support for the stock when the chains are spread apart in maximum and intermediate width adjustments as shown in Figures 3 and 4.

The lateral spacing of the four chains in each conveyor to effect width adjustment is determined by a series of parallel chain guide plates 41 to 44 which form supporting tracks for the rollers 31 under and over the stock. The guide plates 41 and 44 on the opposite sides of the conveyor may be referred to as the outside guide plates, and the intervening guide plates 42 and 43 may be referred to as the intermediate guide plates. On the ends of the chain guide plates 42, 43 and 44 are sprocket guides 45, shown in Figure 6, for shifting the driving and idler sprockets, along with the chains, each chain guide plate thereby having a sprocket guide at one end for shifting a driving sprocket, and a sprocket guide at the other end for shifting an idler sprocket. The sprocket guides have arcuate ends which engage in grooves 46 in the sprockets to maintain them in alignment with the chain guide plates. The driving sprockets 32 in each conveyor have splined hubs mounted on a splined driving shaft 47, and the idler sprockets 33 have smooth bore hubs mounted on the smooth idler shaft 48. The details of the width adjusting mechanism will be hereinafter described.

The shafts 47 and 48 in the bottom conveyor 11 are carried in the ends of a pair of stationary lower side frame members 50 and 51 bolted to the base 10. The corresponding sprocket shafts for the top conveyor 12 are carried in the ends of a pair of upper side frame members 52 and 53 mounted for vertical adjustment on the corner supports 15. In both conveyors the idler shafts 48 are journaled in adjustable sliding take-up bearings 49. The lower and upper splined driving shafts 47 carry bevel gears 54 and 55, respectively, in mesh with bevel gears 56 and 57 on the vertical drive shaft 18, the upper end of which is splined at 58 to allow the gear 57 to rise and fall with the upper side frame member 52, as shown in Figure 1.

Vertical adjustment

The upper side frames 52 and 53 are each carried by a pair of integral vertical sleeves 60 which are internally threaded to fit the threads 61 on four vertical adjusting shafts 62, as shown in Figure 1. The shafts 62 thus form rotatable posts having shoulders 63 by means of which they are supported for rotation upon shouldered abutments 69 in tubular portions 64 of the corner supports 15 which are integral with the lower side frames 50 and 51. The lower ends of these vertical shafts have depending bolts 65 carrying springs 66 seated against thrust bearings 67 under the abutments 69 to provide resilience for the upper frame and conveyor so that it can rise against the spring tension to override the stock. When the stock is of uniform thickness, the springs 66 operate to grip it between the two conveyors with a uniform force depending upon the vertical adjustment of the sleeves 60 on the shafts 62. Thus, the shafts 62 may be turned to cause the upper conveyor to lightly engage the top of the stock, or to apply a firm pressure thereagainst under the control of the operator. The spring tension on the four shafts may be equalized by adjusting the nuts 68 on the bolts 65.

The four shafts, or posts, 62 have sprockets 70 on their upper ends carrying a chain 71 whereby all the shafts may be turned simultaneously the same amount by the hand wheel 14 on one of these shafts. When the hand wheel 14 is turned, the upper conveyor 12 is lifted or lowered equal amounts at all four corners to obtain the proper vertical adjustment for holding a flitch or portion of a flitch firmly between the two conveyors without allowing relative movement of the flitch in the conveyors, or relative movement of the veneer strips in the flitch, while they are being acted upon by the cutter heads 20 and 21.

The upper end of each tubular portion 64 above the abutment 69 forms a short bearing for the lower end of its shaft 62, and this journal portion of the shaft is preferably ground to a long radius curve to permit limited rocking of the shaft in the bearing without binding. The upper conveyor thereby floats to some extent in four socket-like supports wherein the springs 66 resiliently hold the shafts 62 in vertical positions.

Throughout most of the length of the conveyors the compressive force exerted upon the stock by the springs 66 is borne by the chain guide plates 41 to 44 which form supporting tracks for the individual conveyor chains. In the upper conveyor these guide plates bear against the chain rollers to apply the spring tension to the top side of the stock, and in the lower conveyor the corresponding guide plates provide a solid base against which this force acts in addition to the weight of the traveling stock. Each of the chain guide plates is supported by a pair of hubs on two width adjusting screws 75.

Width adjustment

There are four, substantially identical, width adjusting screws 75, two in the bottom conveyor 11 and two in the top conveyor 12, as shown in Figures 2 and 6. Each of these screws has a long splined end 76, a right-hand threaded portion 77, and two left hand threaded portions 78 and 79. Between the threaded portions 77 and 78 is a smooth journal 80 having a groove 81, the journal diameter being the same as the outside diameter of the threaded portions 77 and 79. The threaded portion 78 is of larger diameter than the rest of the screw shaft. The lead of the threads in the portions 77 and 78 is the same in amount but in opposite directions, but the portion 79 carries a double thread having twice the lead of the other threads.

In the top conveyor, the splined ends 76 are slidably supported in internally splined bevel gears 85 mounted in bearings 86 in the top frame member 53. In the lower conveyor, each splined end 76 is similarly carried in an internally splined bevel gear 87 journaled in a bearing 88 in the lower frame member 51. The top and bottom bevel gears 85 and 87 are respectively meshed with bevel gears 89 and 90 on two short vertical width adjusting shafts 91, and the two lower shafts 75 carry sprocket wheels 92 interconnected by a chain 93 whereby the four width adjusting shafts 75 are rotated in unison by the hand wheel 13 on one of the shafts. Each vertical shaft 91 is fixed in its gear 90 which is in turn carried by a bearing 94 on the lower frame 51, and the upper gears 89 are mounted in bearings 95 carried by the upper frame 53, the gear 89 and shaft 91 being splined for relative sliding movement to accommodate vertical movements of the upper conveyor.

On the other side of the machine, the threaded ends 79 of the width adjusting screws are supported in threaded sleeves 96 in the lower and upper frame members 50 and 52, and the lower and upper chain guide plates 41 are fixedly secured to these sleeves in integral relation with the respective frame members. The guide plates 42 are supported on internally threaded hubs 97 riding on the threaded portions 78 of the width adjustment screws, and the guide plates 43 are supported on smooth bore hubs 98 riding on the smooth journal portions 80, snap rings 99 or the like being retained in these hubs to ride in the grooves 81 to maintain the hubs in position between the threaded portions 77 and 78. The guide plates 44 are supported on internally threaded hubs 100 riding on the threaded portions 77.

The above described mounting of the chain guide plates in the upper and lower conveyors provides for moving them in parallelism to form the desired width of conveyor with equal lateral spacing between the conveyor chains for all width adjustments. When the hand wheel 13 is turned in left hand rotation, its width adjusting screw shaft is advanced through the threaded sleeve 96 a distance equal to the lead of the threads on the threaded portion 79 in each complete rotation, and the chain guide plate 43 positioned by the snap ring 99 is moved the same distance away from the stationary guide plate 41. This rotation of the screw causes right and left-hand threaded portions 77 and 78 to spread the guide plates 44 and 42 equally on opposite sides of the plate 43 in the course of movement of the latter. By reason of the fact that the lead of the thread 78 is only half as great as the lead of the thread 79, the guide plate 42 is backed up on the screw half as far as the screw advances, to maintain this plate spaced intermediate between the plates 41 and 43 in all positions of adjustment. When the hand wheel 13 is turned in a right-hand direction, the above described movements are reversed to bring the chains together for the minimum width adjustment of the conveyors, the previously described bevel gear and chain drives between the four shafts 75 being operative to produce the same action in all four screws simultaneously.

Figure 7:
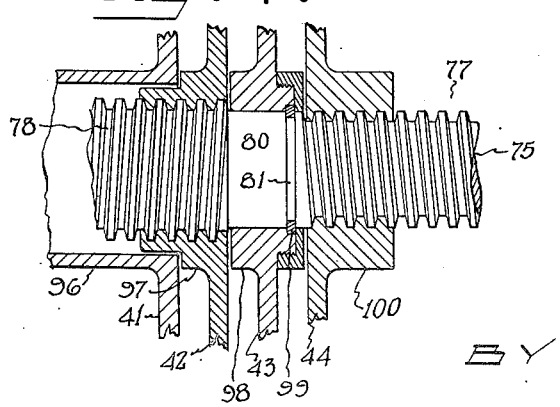
Figure 7 is an enlarged fragmentary view showing the relative positions of the conveyor guide plates on the adjusting screws in minimum width adjustment.

In the maximum and intermediate width adjustments, the various chain pads 34 to 36 are spaced symmetrically to provide distributed supporting and clamping surfaces for the stock, and in the minimum width adjustment these pads interfit to provide a substantially continuous supporting surface on each conveyor. When the conveyors are extended to maximum width, they occupy substantially all the space between the side frame members of the machine as shown in Figures 2 and 3, but when they are contracted one side remains stationary on the stationary guide plate 41 and the other side moves in closer to this guide plate and to the bottom and top frame members 50 and 52. Figure 6 illustrates the positions of the parts to produce the intermediate width adjustment shown in Figure 4, and Figure 7 shows the positions of the parts to produce the minimum width adjustment shown in Figure 5.

The cutter heads

The cutter head 20 is mounted in a stationary cutter head frame 110 which is integral with the lower frame member 50 and the lower stationary chain guide plate 41. In order to follow the width adjustments of the conveyor, the other cutter head 21 is mounted in a traveling cutter head frame 111 attached to the lower guide plate 44. The two cutter heads are thereby always maintained in fixed relation with their adjacent chain guides which determine the positions of the opposite side edges of the conveyor.

The cutter heads are carried on vertical shafts 112 and 113 in their respective cutter head frames. The lower end of the shaft 112 carries a bevel gear 114 in mesh with a similar bevel gear 115 fixed on the end of the horizontal cutter shaft 22, these gears and shaft ends preferably being mounted in and enclosed by a fixed gear housing 116 attached to the base 10. The lower end of the shaft 113 carries a bevel gear 117 meshing with an internally splined bevel gear 118 adapted to slide on a splined portion of the shaft 22, these parts being enclosed by a sliding gear housing 119.

This gearing arrangement provides a positive synchronized drive for the two cutter heads while permitting their relative movement to maintain the above described predetermined relation with the respective side edges of the conveyor for all width adjustments. When a bundle of veneer strips is fed between the conveyors, it is firmly gripped and compressed thereby to hold all the pieces in their original positions as they are passed between the cutter heads for edge jointing. All the strips in the bundle are jointed on opposite edges at the same time to insure uniform width and parallel edges.

Both the width and thickness adjustments may be changed progressively in infinitesimally small increments while the motors are running, thereby adapting the present mechanism particularly for handling stock of different widths and thicknesses. As will be apparent from the drawings, this machine construction provides for a considerable latitude of adjustment, both as to the width and thickness of the stock it will handle, and the combination of these various features and advantages enables the present machine to handle bundles of thin veneers with great expediency.

Various changes may be made in the construction and arrangement of parts, and all such modifications within the scope of the appended claims are included in the invention.

Having now described my invention and in what manner the same may be used, what I claim as new and desire to protect by Letters Patent is:

1. In a wood veneer edge jointer, a variable width conveyor, and a plurality of stock engaging pads substantially uniformly distributed laterally and longitudinally on said conveyor in all width adjustments of the conveyor to interfit to form a substantially continuous supporting surface in a minimum width adjustment and to separate upon expansion of said conveyor to provide substantially uniformly distributed supporting areas.

2. In a wood veneer edge jointer, lower and upper conveyors having parallel moving elements, pads on individual elements extending laterally therefrom to overlie adjacent elements when the elements are close together for engaging stock received between said conveyors and traveling with said stock, means resiliently urging said two conveyors together to grip and compress said stock on opposite sides thereof, and means to vary the effective widths of said conveyors to handle stock of different widths.

3. In a wood veneer edge jointer, lower and upper conveyors arranged for receiving and gripping stock therebetween, each of said conveyors comprising a plurality of endless conveyor elements arranged side by side, means to adjust the lateral spacing of said conveyor elements to vary the width of said conveyors, and pads on individual conveyor elements extending laterally therefrom to overlie adjacent conveyor elements when said elements are adjusted close together.

4. In a wood veneer edge jointer, a conveyor comprising a plurality of endless conveyor elements arranged in side by side relation, means to vary the lateral spacing of said conveyor elements to change the width of said conveyor, and a plurality of work engaging pads attached at intervals to individual conveyor elements, said pads being spaced longitudinally on said conveyor elements and projecting laterally therefrom so as to interfit to form a substantially continuous stock supporting surface when said conveyor is adjusted to minimum width, and to provide a plurality of substantially equally spaced and distributed stock supporting surfaces when said conveyor is expanded to intermediate and maximum widths.

5. In a wood veneer edge jointer, a conveyor comprising a plurality of endless conveyor elements arranged in side by side relation, a combination track and guide member for each of said elements to support said elements and determine their relative lateral positions, means to vary the spacing of said members to adjust the width of said conveyor, and pads longitudinally spaced on the individual conveyor elements extending laterally therefrom in staggered relation to interfit when said elements are adjusted close together.

6. In a wood veneer edge jointer, a conveyor comprising a plurality of endless roller chains arranged in side by side relation, a guide track supporting each of said chains, means to vary the lateral spacing of said guide tracks to adjust the width of said conveyor, and pads on each of said chains extending laterally therefrom to overlie adjacent chains when said chains are adjusted close together.

7. In a wood veneer edge jointer and the like, a conveyor having a purality of parallel endless chain type conveyor elements arranged in side by side relation, a longitudinal guide member for each conveyor element having a supporting track for the element, said guide members being mounted for relative lateral movement, a transverse screw shaft for adjusting the lateral spacing of said guide members to vary the width of the conveyor, threaded portions on opposite ends of said shaft engaging the respective outside guide members on opposite sides of the conveyor, a central threaded portion on said shaft engaging an intermediate guide member, the lead of the thread on one of said end threaded portions being double the lead of said central threaded portion and in the same direction, the lead of the thread on the other end threaded portion being equal to the lead of said central portion but opposite in direction, and an unthreaded portion on said shaft between said central and other end threaded portions engaging another intermediate guide member.

8. In a wood veneer edge jointer and the like, a frame having a conveyor with a plurality of parallel endless chain type conveyor elements arranged in side by side relation, a longitudinal guide member for each conveyor element having a supporting track for the element, there being a pair of outside guide members at opposite sides of the conveyor and a pair of intermediate guide members therebetween, one of said outside guide members being stationary in said frame and the other guide members being movable laterally, a transverse screw shaft for adjusting the lateral spacing of said guide members to vary the width of the conveyor, threaded portions on opposite ends of said shaft engaging the respective outside guide members, a central threaded portion on said shaft engaging one of said intermediate guide members, the lead of the thread on one of said end threaded portions being double the lead of said central threaded portion and in the same direction, the lead of the thread of the other end portion being equal to the lead of said central portion but opposite in direction, said one end threaded portion engaging said stationary guide member, and an unthreaded portion on said shaft between said central threaded portion and other end threaded portion engaging the other intermediate guide member to maintain equal lateral spacing between the conveyor elements in all width adjustments of the conveyor.

MICHEL PASQUIER.

(References on following page)

REFERENCES CITED

The following references are of record in the file of this patent:

UNITED STATES PATENTS

| Number | Name | Date |
|---|---|---|
| 535,673 | Clayton | Mar. 12, 1895 |
| 650,820 | Bugbee et al. | June 5, 1900 |
| 1,447,878 | Littleford et al. | Mar. 6, 1923 |
| 1,643,194 | Black | Sept. 20, 1927 |
| 1,693,606 | Jones | Dec. 4, 1928 |
| 1,716,742 | Smith et al. | June 11, 1929 |
| 1,746,919 | White | Feb. 11, 1930 |
| 1,811,299 | Brockhaus | June 23, 1931 |
| 1,911,961 | Melnick | May 30, 1933 |
| 2,123,432 | Mattison | July 12, 1938 |
| 2,207,782 | Carlson | July 16, 1940 |
| 2,242,179 | Gustin | May 13, 1941 |
| 2,273,653 | Melby | Feb. 17, 1942 |
| 2,279,112 | Drake et al. | Apr. 7, 1942 |
| 2,345,937 | Joa | Apr. 4, 1944 |